Sept. 20, 1955     W. C. HANSEN     2,718,417
FASTENER FOR HANDLES
Filed June 28, 1951
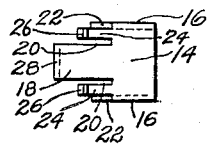
Fig. 4
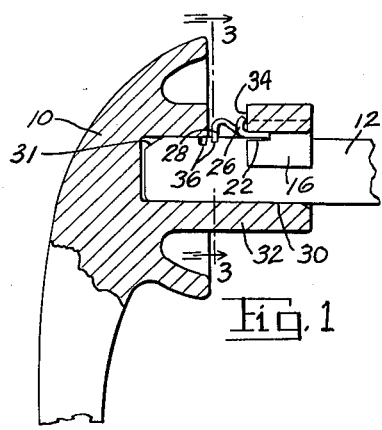
Fig. 1
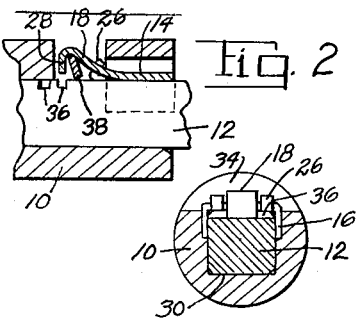
Fig. 2
Fig. 3
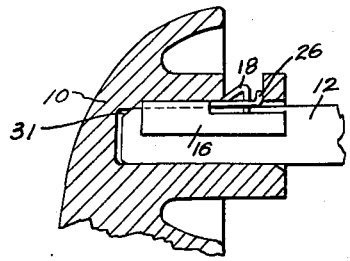
Fig. 5
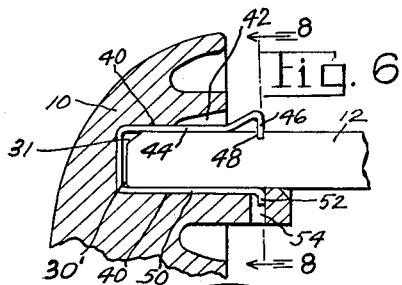
Fig. 6
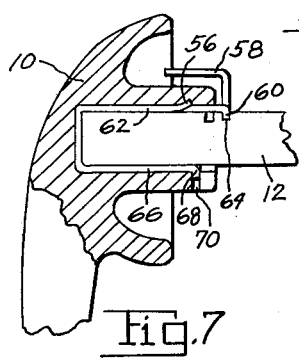
Fig. 7
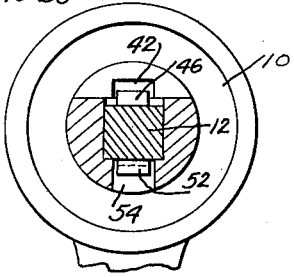
Fig. 8
INVENTOR.
WRAY C. HANSEN
BY
HIS ATTORNEY

2,718,417

FASTENER FOR HANDLES

Wray C. Hansen, Detroit, Mich.

Application June 28, 1951, Serial No. 234,040

3 Claims. (Cl. 287—53)

This invention relates to a fastener for securing two parts together and more particularly to a fastener wherein the parts are assembled by sliding one part over the other and the fastener prevents relative axial movement and relative rotary movement.

It is an object of the present invention to provide a fastener of sheet metal which may be formed by stamping and one in which the material is made of spring steel.

Another object of the invention is to provide a fastener which may be readily applied to one of the parts, forming therewith an assembly, and the other part assembled thereto by sliding one part over the other.

A further object of the invention is to provide the fastener with portions having inter-locking engagement with the assembled parts and so constructed and arranged that disengagement may be made after the parts have been assembled.

Other objects and advantages of the invention will more fully appear from the following description taken in connection with the accompanying drawings, in which:

Fig. 1 is a cross sectional view of a handle applied to a shaft with the fastener shown in side elevation and in its assembled position;

Fig. 2 is a fragmentary view, corresponding to Fig. 1 showing the fastener interengaging means, removed from locking engagement;

Fig. 3 is a sectional view taken on line 3—3 of Fig. 1;

Fig. 4 is a top plan view of the fastener;

Fig. 5 is a cross sectional view corresponding to Fig. 1 but showing a modified form of assembly;

Fig. 6 is a cross sectional view corresponding to Fig. 1 showing a modified form of the fastener;

Fig. 7 is a cross sectional view corresponding to Fig. 1 showing a further modification of the fastener; and Fig. 8 is a cross sectional view taken on line 8—8 of Fig. 6.

Referring to the drawings, I have shown the parts for assembly as representing an automobile door handle 10, and a latch bolt shaft 12 to which the handle is secured.

Under modern production assembly it is desirable to apply the parts as quickly and easily as possible and at the same time securely retain the parts in assembled relation. This has been accomplished by providing a fastener which may be previously assembled to the handle and the operator on the assembly line merely slides the handle on the shaft and a locking member on the fastener snaps into locking position with the shaft.

The fastener is formed from sheet spring material and is stamped to form having a central flat face portion 14 and lateral flat faces 16, forming generally a U-shaped member. The central flat face portion 14 is provided with an arm 18 extending outwardly from one end of the U-shaped member. Transversely spaced cuts 20 are formed in the central flat portion 14, extending from the edge of the U member into the body thereof, to form the arm 18. The corners at the juncture of the central portion 14 and the lateral faces 16 are severed, as at 22, from the end of the U-shaped member into the body thereof, to form tabs 24 at the one end of the central portion 14 and at the opposite sides of the arm 18. The tabs 24 and the arm 18 are spring fingers which, by the cuts 20 and 22, are flexible for movement into or out of the plane of the central portion 14. The outer free ends of the tabs 24 are bent upwardly and reversely to provide hook portions 26. The outer free end of the arm 18 is bent slanting upwardly out of the plane of the central portion 14 and its outer end is bent downwardly at right angles to the plane of the central portion 14, as indicated at 28.

The shaft is square in cross section. The handle is provided with a square opening 30 in a hub portion 32. The hub 32 has an opening 34, extending radially therethrough and around a portion of the circumference of the hub.

The fastener is fitted into opening 34 with the arm 18 and hooks 26 directed inwardly of the opening 30; the inwardly bent portion 28 and the hooks normally positioned in the opening 34. The hooks 26 engage the wall of the opening 34 to prevent outward movement of the fastener from the opening 30 and the bent portion 28 is free for radial springing movement with respect to the opening 30.

The shaft is provided with one or more notches 36 for the reception of the bent portion 28. When the handle and fastener are assembled to the shaft, the shaft, at the beginning of assembly, forces the arm 18 and its bent portion 28 outwardly until the notch 36 aligns with the portion 28 whereupon the latter is spring pressed into the notch 36, thereby retaining the handle on the shaft. The outer end of the shaft 12 is provided with a chamfer 31 which slidingly engages the end portion 28 to cam the latter outwardly.

If it is desired to remove the handle from the shaft, a tool 38, such as a screw driver, see Fig. 2, is inserted through the opening 34 under the arm 18. By twisting the tool the bent portion 28 is removed from the notch 36 and the handle and fastener can be slid off of the shaft 12. It is to be noted that as the tool is twisted, the spring pressure in the arm urges the tool into tight engagement with the shaft and fastener and the twisting causes the handle to be moved on the shaft sufficiently to prevent the bent portion 28 from re-entering the notch 36 when the tool is removed.

In Fig. 1, I have shown the body of the fastener carried in the hub portion of the handle. In Fig. 5, I have shown substantially the same fastener, except that the main body of the fastener is carried in the body of the handle, where it is necessary to provide a short hub and the fastener is inserted reversely from that shown in Fig. 1.

Fig. 6 illustrates a fastener of U-shaped design but it embraces two opposite sides and the end of the shaft, rather than an intermediate and two adjacent sides, as shown in Fig. 1. In this form the opposite side faces of the opening 30' in the handle are grooved, as at 40, to receive the legs of the fastener. A cut away portion 42 is provided to permit one leg 44 of the fastener to be sprung upwardly as the shaft is inserted in the opening. The leg 44 is provided with an inwardly bent portion 46 which is spring pressed into a notch 48 in the shaft.

The opposite leg 50 has an outwardly bent projection 52 adapted to be spring pressed into a radial opening 54 in the hub of the handle.

Fig. 7 illustrates a further modification of the invention wherein resilient tabs 56 are formed in the spring leg 62 of the fastener which bite into the wall of the opening in the handle to prevent removal of the fastener from the handle. There is also provided, in this form of the invention, a part 58, stamped from the leg 62, projecting outwardly over the hub, for removing the inwardly extending projection 60, on the spring leg 62, from the notch 64 in the shaft 12 when it is desired to remove the handle. The other leg 66 of the U-shaped fastener is provided with an outwardly extending projection 68 which is received in a radial opening 70 in the hub for retaining the fastener within the handle.

While I have herein illustrated and described some of the embodiments of the invention, it will be understood that various changes, including the size, shape and arrangement of parts, may be made without departing from the spirit of my invention and it is not my intention to limit its scope other than by the terms of the appended claims.

I claim:

1. A sheet metal fastener of sheet spring material comprising a U-shaped body portion, a leg formed from the central portion of said body portion at one edge thereof and normally bent outwardly from the plane of the central portion of said body portion, an inwardly extending projection at the free end of said leg normally extending beyond the inner surface of the central portion but movable into the plane of the central surface by the outward deflection of said leg, and a second leg formed from the central portion having an outwardly extending projection beyond the outer surface of the central portion but movable into the plane of the central surface by the inward deflection of said leg, said second leg being spaced inwardly from the side surfaces of said U-shaped body portion.

2. A sheet metal fastener of sheet spring material comprising a U-shaped body portion, a leg formed from the central portion of said body at one edge thereof and normally bent outwardly from the plane of the central portion of said body portion, an inwardly extending projection at the free end of said leg normally extending beyond the inner surface of the central portion but movable into the plane of the central surface by the outward deflection of said leg, and a second leg formed from the central portion having an outwardly extending projection beyond the outer surface of the central portion but movable into the plane of the central surface by the inward deflection of said second leg.

3. In a connection for separable parts including a handle part having an apertured face and a radial opening therethrough intersecting the aperture, a shaft part disposed in the aperture of said handle, said shaft having a notch therein, a fastener of spring material engaging said parts comprising a U-shaped body portion, a leg formed from the central portion of said body at one edge thereof and normally bent outwardly from the plane of the central portion of the body portion, an inwardly extending projection at the free end of said leg normally extending beyond the inner surface of the central portion but movable as the handle part is placed onto the shaft part first into the plane of the central surface by the outward deflection of said leg and then into said notch for locking engagement with said shaft, and a second leg formed from the central portion having an outwardly extending projection beyond the outer surface of the central portion but movable as the handle part is placed onto the shaft part first into the plane of the central surface by the inward deflection of said second leg then into said radial opening of said handle for locking engagement with the handle.

References Cited in the file of this patent

UNITED STATES PATENTS

| 2,295,444 | Woodward | Sept. 8, 1942 |
| 2,574,330 | Judd | Nov. 6, 1951 |

FOREIGN PATENTS

| 23,668 | France | July 26, 1921 |